Patented Dec. 28, 1926.

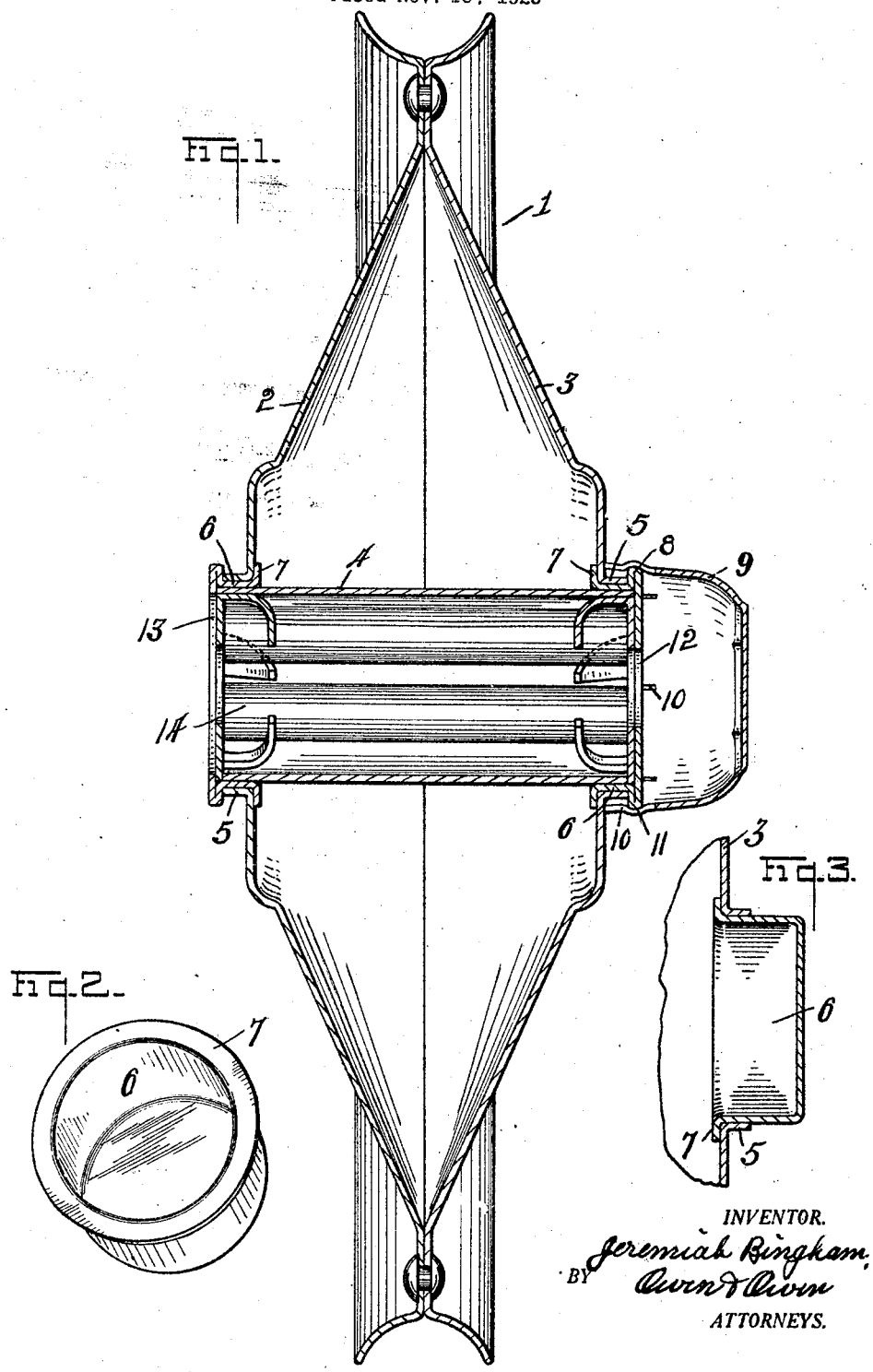

1,612,169

UNITED STATES PATENT OFFICE.

JEREMIAH BINGHAM, OF TOLEDO, OHIO, ASSIGNOR TO THE BINGHAM STAMPING & TOOL COMPANY, OF TOLEDO, OHIO, A CORPORATION OF OHIO.

BEARING ASSEMBLY.

Application filed November 16, 1925. Serial No. 69,314.

This invention relates to roller bearings, and has for its object the provision of a novel, simple and inexpensive bearing assembly that is composed of few parts and is especially adapted for use in connection with sheet metal wheels, pulleys, rollers, castors or the like.

The invention is fully described in the following specification, and one embodiment thereof illustrated in the accompanying drawings, in which,—

Figure 1 is a section of a wheel embodying the invention taken longitudinally through the axis of the wheel and with a part shown in full. Fig. 2 is a section on the line 2—2 in Fig. 1 with an axle in position therein, and Fig. 3 is a perspective view of one of the roller spacing members of the invention.

Referring to the drawings, 1 designates a wheel, in the present instance of the disc type, adapted particularly for use in connection with juvenile vehicles but not restricted to such use, and having the opposing discs 2 and 3. These discs are provided at their centers with openings for receiving the respective ends of the customary hub barrel 4, and, in the present instance, the barrel ends have bearings in respective sleeves 5 secured in the flanged walls of the wheel disc openings.

The sleeves 5 are shown as being in flanged engagement with the inner sides of the respective discs 2 and 3 and also in flanged engagement with the outer ends of the disc flanges in which disposed, and each sleeve has an inwardly turned portion preferably in the form of a flange 6 at its outer end for engagement with the adjacent end edge of the barrel 4. The flange 6 at the outer end of the hub is preferably extended inwardly beyond the inner edge of the adjacent barrel end to partially close the same. The opening of the other flange 6 is preferably the same as that of the barrel to permit the insertion of a bearing unit into the barrel.

A bearing unit embodying the invention comprises an annular series of parallel transversely spaced rollers 7 adapted to be assembled within the barrel 4 around the axle 8 therein, so as to provide an antifriction bearing between said parts, as is customary in wheels of this character. Disposed in each end of the barrel 4 is a spacer 9 for the rollers 7, which spacer comprises a flat, washer-like body 10 of a diameter corresponding to the internal diameter of the barrel 4 to adapt it to fit snugly therein and having a central opening 11 for the axle 8 to project freely through. The body 10 of the spacing member is provided in equi-distantly spaced relation around its outer edge with tongues 12, which are turned laterally in the same direction from the body 10 and then inwardly toward each other to adapt them to project between the adjacent end portions of the several rollers 7 so as to provide and maintain the desired spacing between such rollers, a tongue 12 being provided between each pair of adjoining rollers. These tongues are of V or tapered form, so that when turned inwardly their adjacent edges are substantially parallel. While the tongues 12 project a sufficient distance between the adjoining rollers to maintain them in predetermined spaced relation, they do not project inwardly to such an extent as to have contact with the axle. The spacing members 9 are preferably stamped from sheet metal and, in order to prevent them from turning in the barrel 4 in which disposed, each is provided at a point in its periphery with a radially projecting spur 13 adapted to enter a corresponding notch 14 provided in the adjacent end of the barrel.

It is apparent that the rollers 7 and spacing members 9 may be assembled in the barrel 4 at any time or at any point in the assembling of the different parts comprising the hub, but, in accordance with the present preferred practice, the spacing member 9, which is disposed at the outer partially closed end of the barrel 4, is positioned therein before the barrel is positioned in the wheel and after the rollers have been assembled in the barrel with one end of each disposed within a space between a pair of the tongues 12 on the outer spacing member, the inner spacing member, or that disposed at the inner end of the hub, is then positioned in the inner end of the hub barrel in spacing relation to the adjacent ends of the several rollers. Any inward thrust on the last-mentioned spacing member relative to the barrel is exerted on the ends of the rollers 7 and through them to the opposite spacing member 9, which has its outer thrust against the inwardly turned flange portion 6 of the hub. When the wheel with its assembled bearing unit is mounted on an axle, the spacing member 9 at the inner end of the hub is prevented from outward dislodgment from the barrel end by the juxtaposition of the usual flange at the inner end of the spindle portion of the axle.

It is found in practice that this provides a very simple, efficient and inexpensive form of bearing unit for a wheel, and that the parts thereof may be easily and quickly assembled in a wheel hub.

I wish it understood that my invention is not limited to any specific construction, arrangement or form of the parts, as it is capable of numerous modifications and changes without departing from the spirit of the claims.

Having thus described my invention, what I claim as new and desire to secure by Letters Patent is:

1. A roller unit comprising an annular set of transversely spaced rollers and a spacing member for the rollers at each end of the set formed of a single piece of sheet metal and comprising a flat ring-like body part, and roller spacing tongues projecting in equi-distantly spaced relation laterally from the outer edge of the body part and then inwardly in spaced relation from the adjacent side of the body part toward each other in the spaces between adjoining rollers.

2. In a wheel, a barrel, an annular set of transversely spaced bearing rollers in the barrel in rolling contact therewith, and a spacing member for each end of the barrel and comprising a sheet metal ring having integral tongues projecting inwardly in spaced relation from the side of said ring into the spaces between the adjoining rollers.

3. In a wheel, a hub barrel, an annular set of rollers mounted in transversely spaced relation in the barrel, and flat ring-like sheet metal members disposed in each end portion of the barrel and having tongues projecting laterally therefrom in spaced relation from the adjacent sides of said members and toward the opposite end of the barrel in which disposed and in side abutting coaction with the inner wall of the barrel, said tongues having their free end portions turned inwardly between adjoining rollers to serve as spacing means therefor, said barrel and members having parts in interengaging relation, means for closing one end of the barrel at least to provide an abutment for the outer side of the adjacent spacing member.

In testimony whereof I have hereunto signed my name to this specification.

JEREMIAH BINGHAM.